US005812735A

United States Patent [19]
Wada

[11] Patent Number: 5,812,735
[45] Date of Patent: Sep. 22, 1998

[54] PICTURE SIGNAL DECODING METHOD AND PICTURE SIGNAL DECODING APPARATUS

[75] Inventor: Tohru Wada, Kanagawa, Japan

[73] Assignee: Sony Corporaiton, Tokyo, Japan

[21] Appl. No.: 833,572

[22] Filed: Apr. 7, 1997

Related U.S. Application Data

[63] Continuation of Ser. No. 387,873, filed as PCT/JP94/01130, Jul. 11, 1994, published as WO95/02300, Jan. 19, 1995, abandoned.

[30] Foreign Application Priority Data

Sep. 7, 1993 [JP] Japan .................................. 5-170690

[51] Int. Cl.[6] .................................................. H04N 5/76
[52] U.S. Cl. .......................... 386/81; 386/111; 386/116
[58] Field of Search ................................. 386/6, 7, 8, 33, 386/68, 81, 82, 95, 109, 111, 112, 116; 360/48, 53; H04N 5/76

[56] References Cited

U.S. PATENT DOCUMENTS

| | | | |
|---|---|---|---|
| 4,882,732 | 11/1989 | Kaminaga | 371/2.2 |
| 4,930,024 | 5/1990 | Kanda et al. | 360/70 |
| 4,931,879 | 6/1990 | Koga et al. | 358/335 |
| 5,040,061 | 8/1991 | Yonemitsu | 358/135 |
| 5,057,916 | 10/1991 | Krause et al. | 358/105 |
| 5,057,949 | 10/1991 | Suga et al. | 360/70 |
| 5,126,852 | 6/1992 | Nishino et al. | 358/335 |
| 5,136,391 | 8/1992 | Minami | 360/10.3 |
| 5,140,437 | 8/1992 | Yonemitsu et al. | 358/342 |
| 5,223,987 | 6/1993 | Müller | 360/10.3 |
| 5,231,484 | 7/1993 | Gonzales et al. | 358/133 |
| 5,247,363 | 9/1993 | Sun et al. | 358/167 |
| 5,282,049 | 1/1994 | Hatakenaka et al. | 358/335 |
| 5,305,113 | 4/1994 | Iwamura et al. | 358/312 |
| 5,371,547 | 12/1994 | Siracusa et al. | 348/426 |
| 5,371,602 | 12/1994 | Tsuboi et al. | 358/335 |
| 5,377,051 | 12/1994 | Lane et al. | 360/33.1 |
| 5,455,684 | 10/1995 | Fujinami et al. | 358/335 |
| 5,504,759 | 4/1996 | Inoue et al. | 360/48 |

FOREIGN PATENT DOCUMENTS

| | | | |
|---|---|---|---|
| 0 482 888 A2 | 4/1990 | European Pat. Off. | H04N 5/92 |
| 448 011 A1 | 9/1991 | European Pat. Off. | H04N 5/783 |
| 454 460 A3 | 10/1991 | European Pat. Off. | H04N 5/92 |
| 0 469 842 A2 | 2/1992 | European Pat. Off. | H04N 5/782 |
| 0 505 985 A2 | 9/1992 | European Pat. Off. | H04N 5/92 |
| 0 509 594 A2 | 10/1992 | European Pat. Off. | G11B 20/10 |
| 0 517 141 A2 | 12/1992 | European Pat. Off. | H04N 7/133 |
| 0 546 865 A2 | 12/1992 | European Pat. Off. | H04N 5/92 |
| 0 536 630 A2 | 4/1993 | European Pat. Off. | H04N 9/79 |
| 38 31 277 A1 | 3/1990 | Germany | H04N 5/91 |
| 60-162392 | 8/1985 | Japan | H04N 7/137 |
| 63-167585 | 7/1988 | Japan | H04N 5/93 |
| 5-22700 | 1/1993 | Japan | H04N 5/93 |
| 5-211643 | 8/1993 | Japan | H04N 5/92 |
| 0 396 285 A2 | 11/1990 | WIPO | H04N 5/92 |
| WO 91/02420 | 2/1991 | WIPO | H04N 7/133 |
| 0 499 088 A3 | 8/1992 | WIPO | H04N 7/137 |

OTHER PUBLICATIONS

International Standard of Multi–media Cording (Maruzen Co. Ltd.), Jun. 30, 1991 (Jun. 30, 1991) pp. 130 to 135.

"*Development of 135 Mbit/s HDTV codec*", Yoshimichi Ohtsuka, Eisuke Nakasu, Hiroyuki Imaizumi and Hiroshi Nakanishi, 8376 Signal Processing Image Communication, 4 (1992)Aug., Nos. 4/5, Amsterdam, NE, pp. 379–387.

(List continued on next page.)

*Primary Examiner*—Brian Casler
*Assistant Examiner*—LuAnnz P. Din
*Attorney, Agent, or Firm*—Limbach & Limbach, LLP

[57] ABSTRACT

Error start codes are inserted, by means of error start code inserting section (12), between transfer units of intra-frame coded data starting from a start code reproduced by reproducing section (11) from picture recording medium (10) to decode intra-frame coded data on the basis of the error start code and the start code at decoder (14).

12 Claims, 9 Drawing Sheets

OTHER PUBLICATIONS

"Motion Vector Replenishment for Low Bit–Rate Video Coding", M. Ghanbari, 8376 Signal Processing Image Communication 2(1990)Dec., No. 4, Amsterdam, NE, pp. 397–407.

"Adaptation and Improvement of CCITT Reference Model 8 Video Coding for Digital Storage Media Applications", Carsten Herpel, Dietmar Hepper and Dietrich Westerkamp, 8376 Signal Processing Image Communication 2(1990)Aug., No. 2, Amsterdam, NE, pp. 171–185.

"A CCITT Compatible Algorithm for Digital Recording of Moving Images", F. Pereira, L. Contin, M. Quaglia and P. Delicat, 8376 Signal Processing Image Communication, 2(1990) Aug., No. 2, Amsterdam, NE, pp. 155–169.

"Video Coding for Recording on a CD–like Magneto–Optical Disc", Carsten Harpek, Dietmar Hepper, Dietrich Westerkamp, Jun. 6–8, 1990, IEEE 1990 International Conference on Consumer Electronics, Digest of Technical Papers, Rosemont, Illinois, Ninth in the ICCE Series, pp. 46–47.

"General Coding of Moving Pictures and Associated Audio", International Organisation for Standardization, Committee Draft, Nov. 5, 1993, Seoul, pp. i–176.

"Test Model 3", International Organisation for Standardisation, CCITT SG XV, Working Party XV/1, Experts Group on ATM Video Coding, Nov. 1992, pp. 1–215.

PICTURE SIGNAL DECODING METHOD AND PICTURE SIGNAL DECODING APPARATUS

This is a continuation of application Ser. No. 08/387,873, filed as PCT/JP94/01130, Jul. 11, 1994, published as WO95/02300, Jan. 19, 1995, now abandoned.

TECHNICAL FIELD

This invention relates to a picture signal decoding method and a picture signal decoding apparatus suitable when used in the case of recording moving picture signals onto a recording medium, e.g., magneto-optical disc or magnetic tape, etc. to reproduce these recorded signals to display them on display, etc., or in similar cases.

BACKGROUND ART

As a moving picture encoding system directed to storage media, so called MPEG (Moving Picture Expert Group) 1 and MPEG (Moving Picture Expert Group) 2 (hereinafter encoding system including both systems will be referred to as MPEG) which are hybrid encoding of Discrete Cosine Transform (DCT) and motion-compensated prediction are known. In MPEG, respective pictures are compression-encoded as any one of picture types of I picture (Intra-coded picture), P picture (Predictive-coded picture) and B picture (Bidirectionally Predictive-coded picture).

I picture uses only information confined solely within a single frame (picture) when encoded. Accordingly, at the time of decoding, it is possible to carry out reconstruction of picture only by information of I picture itself. In practice, an input picture (frame) is caused to undergo DCT without taking differences to allow it to be intra-frame coded (intra-coded) picture.

P picture uses I picture or P picture positioned forward in point of time and already encoded as predictive picture, i.e., picture serving as reference in taking differences. In practice, it is possible to select, in macro block units, any higher efficiency method of a method of encoding differences between a current frame (picture) and a predictive picture which have undergone motion-compensation and a method of intra-frame coding (intra-coding) a current frame (picture) without taking differences.

B picture uses, as predictive picture, three kinds of pictures of I picture or P picture positioned forward in point of time and already encoded, I picture or P picture positioned backward in point of time and already encoded, and interpolated picture prepared from the both pictures. It is possible to select, in macro block units, the highest efficiency coding of coding of differences of three kinds of pictures which have undergone motion-compensation and intra-frame coding (intra-coding).

Figure 1A:
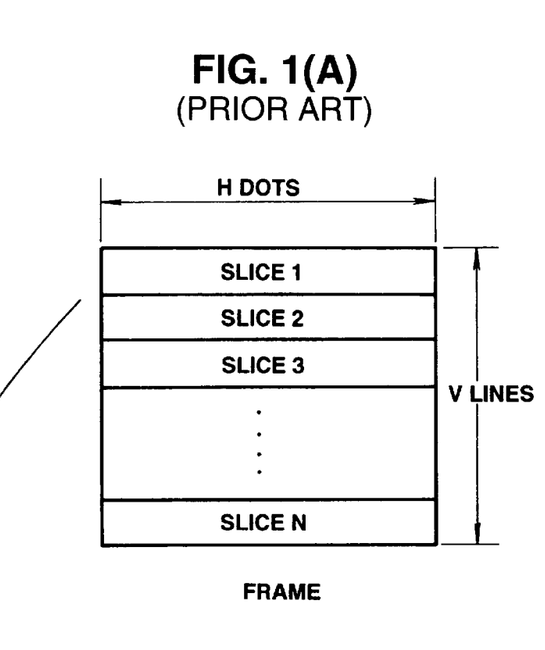
FIGS. 1(A) through 1(C) are views showing structure of picture data in the MPEG system
Figure 1B:
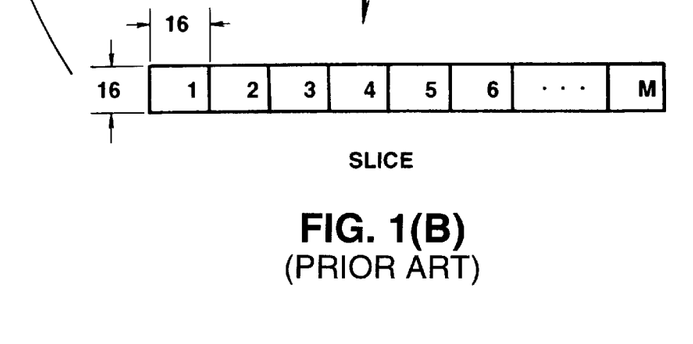
Figure 1C:
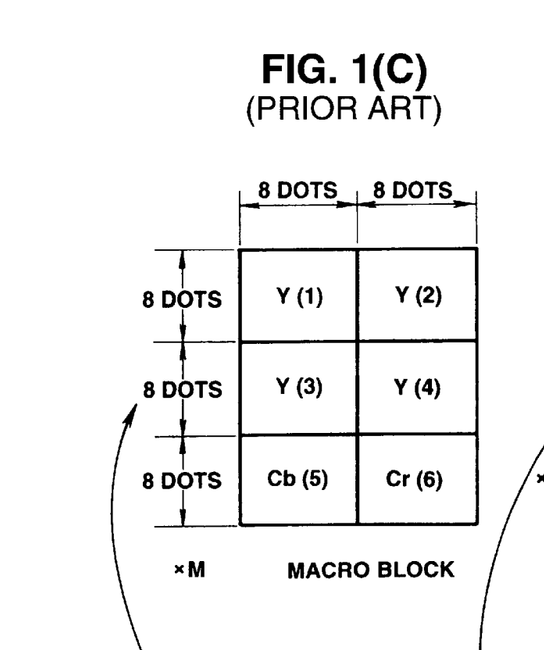

FIGS. 1(A) through 1(C) show data structure of respective pictures. As shown in FIG. 1(A) through 1(C), each picture (frame) is comprised of at least one slice or a plurality of slices. Moreover, each slice is comprised of one or plural macro blocks continuous in order of scanning of picture. Each macro block is composed of 6 blocks of four luminance blocks Y[1], Y[2], Y[3], Y[4] adjacent in left and right directions and in upper and lower directions, and color difference blocks Cb[5], Cr[6] corresponding to the same positions as those of luminance blocks Y[1], Y[2], Y[3], Y[4] on picture.

A unique code which cannot be represented by combination of any other codes, that is called PSC (Picture Start Code) is added to the leading portion of picture data of such structure. Picture start code consists of 32 bits, wherein the first 24 bits are "0000 0000 0000 0000 0000 0001" and the remaining 8 bits have value of "00" in hexadecimal notation. Moreover, a unique code which cannot be represented by combination of any other codes, that is called SSC (Slice Start Code) is added to the leading portion of the above-described slice data. Slice start code consists of 32 bits, wherein the first 24 bits are "0000 0000 0000 0000 0000 0001" similarly to the above-mentioned picture start code, and 8 bits succeeding (subsequent) thereto are called slice vertical position, and indicate vertical position of the leading macro block within slice. As stated above, start codes consist of 32 bits, and serve as an identifier in which the first 24 bits indicate that those bits are start bit and the latter (remaining) 8 bits indicates kind of start code. Decoder can use such start codes for providing synchronization.

Here, in the case where bit stream of MPEG is assumed to be recorded onto a recording medium, such as, for example, compact disc (CD), when reproduction is carried out at an ordinary speed, continuous picture data are sent to decoder as data of I picture as shown in FIG. 2(a). On the other hand, in the case where access to an arbitrary position on the recording medium is made by pick-up device, since data are read out with sectors determined synchronously with start code being as a unit, they are transferred to the decoder in the form including invalid data as shown in FIG. 2(b). If it is possible to decode valid intra-frame coded data in a synchronous manner by using start code from those data, fast feed reproduction or fast return (reverse) reproduction can be made. However, in such a case, invalid data of transfer units before and after which have no continuity are connected, resulting in the possibility that the same code as start code may appear. Thus, there is the possibility that synchronization of code may be out of order so that the state where correct decode operation cannot be conducted takes place.

In addition, in order to ensure synchronization of code to permit decode operation to be conducted by decoder, it is required to transfer, from pick-up device, picture data starting from start code as shown in FIG. 2(c). For this reason, it was necessary to detect position of start code on recording medium by any means to provide an access to position of start code on recording medium by using pick-up device, or to impose such a restriction on the recording medium side to write bit stream in order that sector on the recording medium and start code are synchronized with each other.

In view of problems of the prior art as described above, an object of this invention is to provide a picture signal decoding method and a picture signal decoding apparatus capable of decoding picture data in a block form from recording medium without imposing restrictions on the recording medium side, thus permitting fast feed/fast return reproduction of picture.

Another object of this invention is to provide a picture signal decoding method and a picture signal decoding apparatus in which fast feed/fast return reproduction of frame unit and slice unit of picture can be made as fast feed/fast return reproduction of picture.

DISCLOSURE OF THE INVENTION

This invention is directed to a picture signal decoding method of decoding coded picture signals recorded on a recording medium to carry out fast feed or fast return reproduction, the method comprising the steps of reproducing a portion of the coded picture signals recorded on the recording medium every predetermined transfer units each including first unique code or codes and intra-frame coded data, inserting second unique codes between the predetermined transfer units before and after the reproduced coded picture signal, detecting the first unique code, and decoding the reproduced coded picture signal in synchronism with the detected first unique code to generate a decoded picture.

In the picture signal decoding method according to this invention, at the step of detecting the first unique code, common code included in the first and second unique codes is detected to discriminate between the unique codes on the basis of non-common code included in the first and second unique codes.

Moreover, in the picture signal decoding method according to this invention, the first unique code is slice start code, and the predetermined transfer unit includes at least one slice code and intra-frame coded data of at least one slice.

Further, in the picture signal decoding method according to this invention, the first unique code is picture start code, and the predetermined transfer unit includes at least one picture start code and intra-frame coded data of at least one frame.

Further, this invention is directed to a picture signal decoding method of decoding coded picture signals recorded on a recording medium to carry out fast feed or fast return reproduction, the method comprising the steps of reproducing a portion of the coded picture signals recorded on the recording medium every predetermined transfer units including intra-frame coded data of at least one slice, sequentially decoding the reproduced coded picture signals in slice units to generate decoded pictures of slice units, sequentially storing the decoded pictures of slice units into a memory corresponding to one frame, and reading out data stored in the memory corresponding to one frame as a display picture.

Furthermore, this invention is directed to a picture signal decoding method of decoding coded picture signals recorded on a recording medium to carry out fast feed or fast return reproduction, the method comprising the steps of reproducing a portion of the coded picture signals recorded on the recording medium every predetermined transfer units including intra-frame coded data of at least one frame, sequentially decoding the reproduced coded picture signals in frame units to generate decoded pictures of frame units, alternately storing the decoded pictures of the frame units into first and second frame memories every frame units, and alternately reading out data stored in the first and second frame memories as a display picture.

Further, this invention is directed to a picture signal decoding apparatus adapted for decoding coded picture signals recorded on a recording medium to carry out fast feed or fast return reproduction, the apparatus comprising : reproducing means for reproducing a portion of the coded picture signals recorded on the recording medium every predetermined transfer units including first unique code or codes and intra-frame coded data, code inserting means for inserting second unique code between predetermined transfer units before and after the reproduced coded picture signal, code detecting means for detecting the first unique code, and decoding means for decoding the reproduced coded picture signal in synchronism with the detected first unique code to generate a decoded picture.

In the picture signal decoding apparatus according to this invention, the code detecting means for detecting first unique code includes means for detecting common code included in the first and second unique codes, and means for discriminating between the unique codes on the basis of non-common code included in the first and second unique codes.

Moreover, in the picture signal decoding apparatus according to this invention, the first unique code is slice start code, and the predetermined transfer unit includes at least one slice start code and intra-frame coded data of at least one slice.

Further, in the picture signal decoding apparatus according to this invention, the first unique code is picture start code, and the predetermined transfer unit includes at least one picture start code and intra-frame coded data of at least one frame.

Furthermore, this invention is directed to a picture signal decoding apparatus adapted for decoding coded picture signals recorded on a recording medium to carry out fast feed or fast return reproduction, the apparatus comprising: reproducing means for reproducing a portion of the coded picture signals recorded on the recording medium every predetermined transfer units including intra-frame coded data of at least one slice, decoding means for sequentially decoding the reproduced coded picture signal in slice units to generate decoded pictures of slice units, and memory means corresponding to one frame for sequentially storing the decoded pictures of slice units, and outputting picture data stored therein as a display picture.

In addition, this invention is directed to a picture signal decoding apparatus adapted for decoding coded picture signals recorded on a recording medium to carry out fast feed or fast return reproduction, the apparatus comprising: reproducing means for reproducing a portion of the coded picture signals recorded on the recording medium every predetermined transfer units including intra-frame coded data of at least one frame, decoding means for sequentially decoding the reproduced coded picture signal in frame units to generate decoded pictures of frame units, and first and second frame memories for alternately storing the decoded pictures of frame units every frame units, and alternately outputting stored data as a display picture.

BEST MODE FOR CARRYING OUT THE INVENTION

A preferred embodiment of this invention will now be described in detail with reference to the attached drawings.

Figure 3:
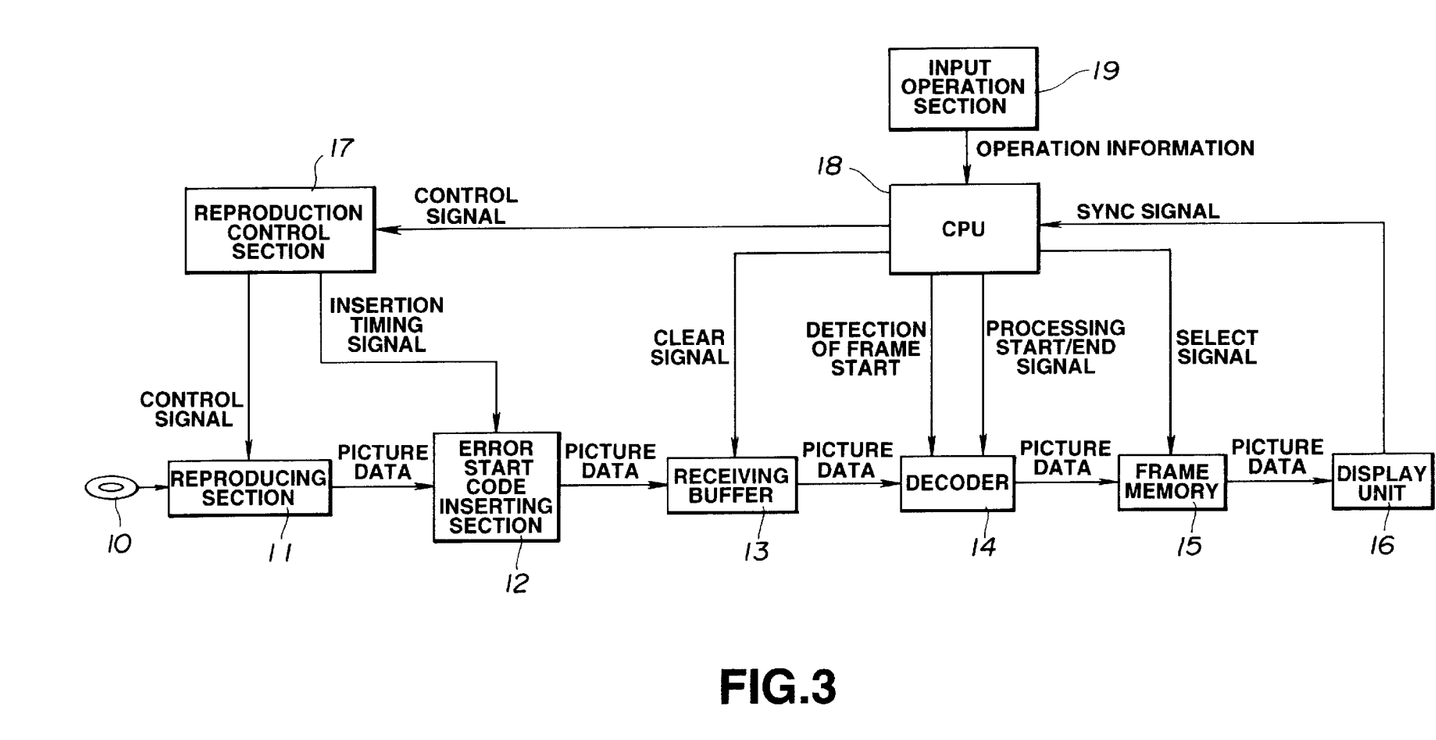
FIG. 3 is a block diagram showing the configuration of a picture reproducing apparatus to which this invention is applied.

A picture signal decoding method and a picture signal decoding apparatus according to this invention are carried out in a picture reproducing apparatus of a structure as shown in FIG. 3, for example.

This picture reproducing apparatus is adapted to reproduce coded picture signals recorded on recording medium 10 by reproducing section 11 to decode the coded picture signals by decoder 14. Coded picture signal reproduced by reproducing section 11 is delivered to decoder 14 through receiving buffer 13 from error start code inserting section 12, and decode output of the decoder 14 is delivered to display unit 16 through frame memory 15. This picture reproducing apparatus includes reproduction control section 17 for controlling the reproducing section 11 and/or the error start code inserting section 12, and Central Processing Unit (labeled CPU in the figure) 18 for controlling the receiving buffer 13, the decoder 14 and the frame memory 15 in accordance with operation information from input operation section 19.

Figure 4:
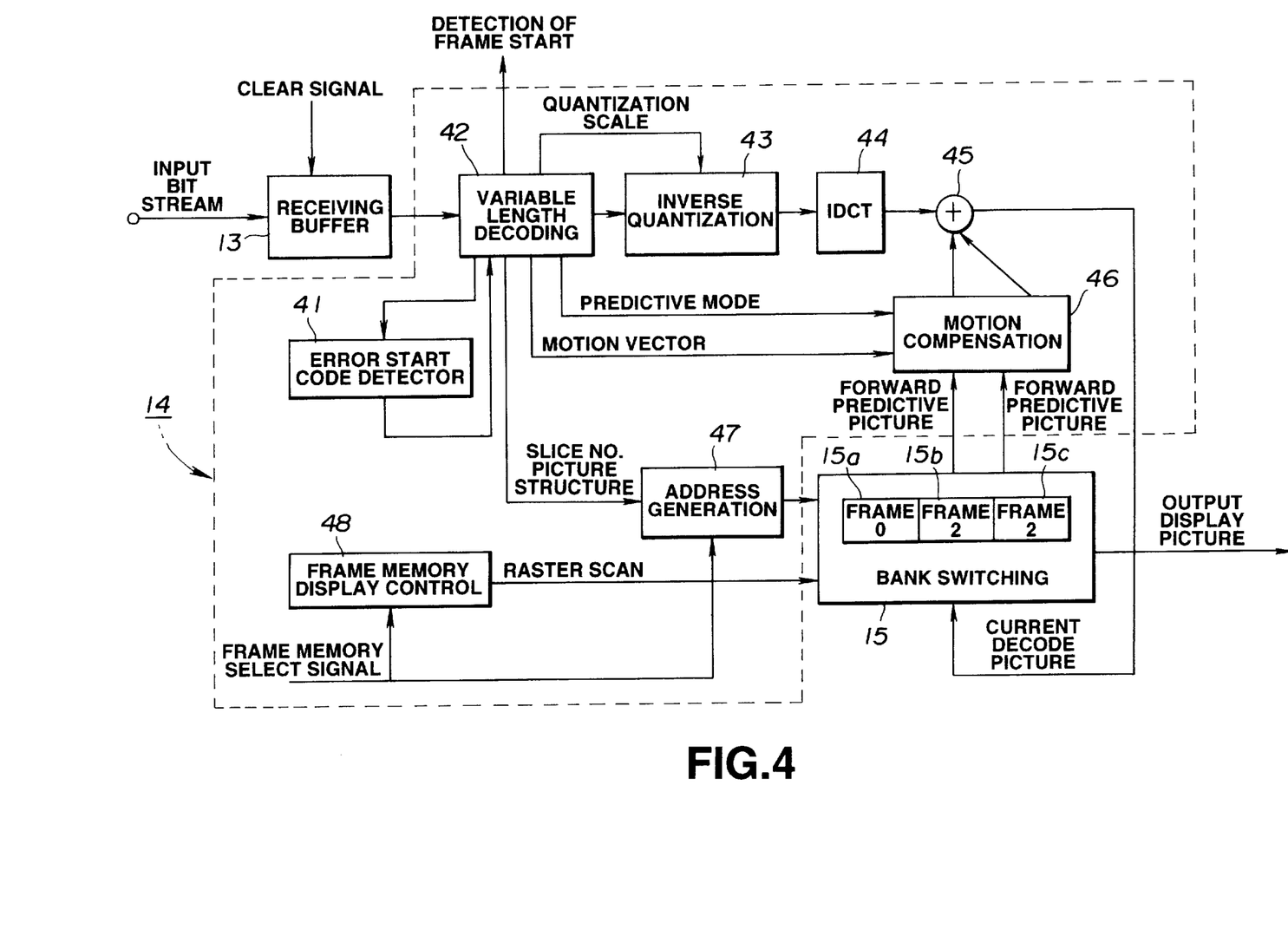
FIG. 4 is a block diagram showing actual example of the configuration of decoder in the above-mentioned picture reproducing apparatus.

Moreover, the decoder 14 comprises, as shown in FIG. 4, for example, error start code detector 41 for detecting error start code included in coded data from the receiving buffer 13, variable length decoding circuit 42 for implementing variable length decoding to coded data from the receiving buffer 13 to reproduce quantized data and motion vector, etc., inverse quantizing circuit 43 for inverse-quantizing quantized data from the variable length decoding circuit 42 to reproduce coefficient data, IDCT circuit 44 for implementing IDCT processing to coefficient data from the inverse quantizing circuit 43 to reproduce picture data or difference data, adding circuit 45 for adding difference data from the IDCT circuit 44 and predictive picture data to reproduce picture data, and motion compensating circuit 46 for reading out picture data from the frame memory 15 on the basis of motion vector, etc. from the variable length decoding circuit 42 to deliver the picture data thus read out to the adding circuit 45 as predictive picture data.

Further, this decoder 14 includes address generating circuit 47 for generating write address of the frame memory 15 on the basis of slice No. from the variable length decoding circuit 42, and frame memory display control circuit 48 for generating address for reading out picture data from the frame memory 15 in order of display on the basis of slice No. from the variable length decoding circuit 42.

Furthermore, the frame memory 15 is comprised of a semiconductor memory having memory capacity corresponding to, e.g., three frames (hereinafter memory corresponding to one frame will be called frame buffer) to carry out bank switching of frame buffers 15*a*, 15*b*, 15*c* on the basis of write address delivered from address generating circuit 47 to store, into, e.g., frame buffers 15*a*, 15*b*, picture data of I picture or P picture delivered from the adding circuit 45 as forward predictive picture data or backward predictive picture data, and stores picture data of B picture into frame buffer 15*c*.

In addition, in this picture reproducing apparatus, transfer unit of picture data sent from reproducing section 11 is determined by operation by user with respect to input operation section 19 and/or kind of recording medium 10, etc.

Figure 5:
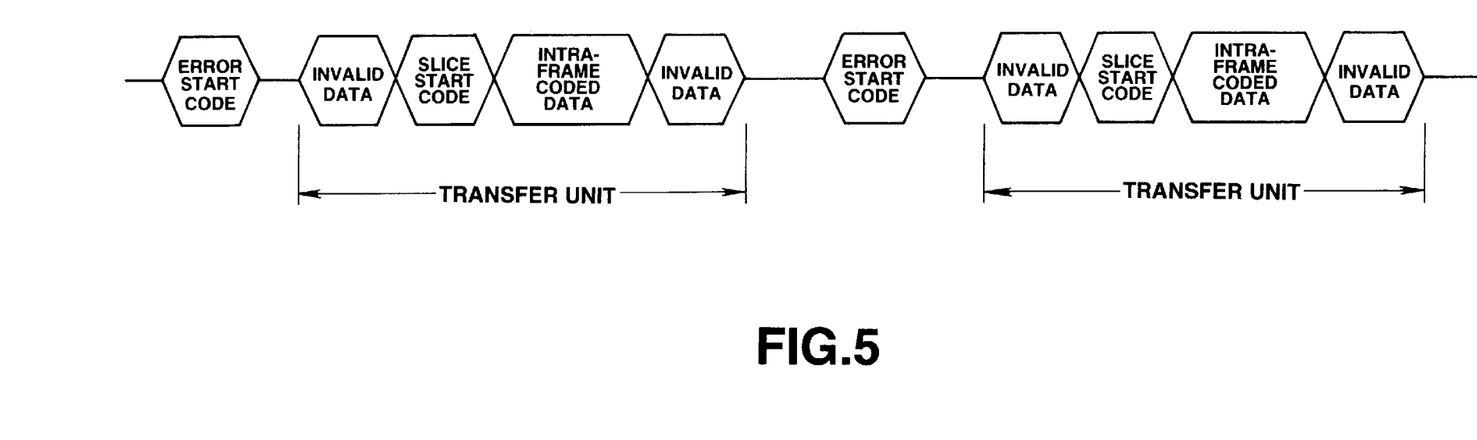
FIG. 5 is a view for explaining picture data of transfer units using slice as reference handled in the above-mentioned picture reproducing apparatus.

Initially, the case where transfer unit of picture data sent from reproducing section 11 is less than one frame, e.g., the case where such transfer unit is a unit using slice as reference as shown in FIG. 5, for example, will be described below.

Figure 6:
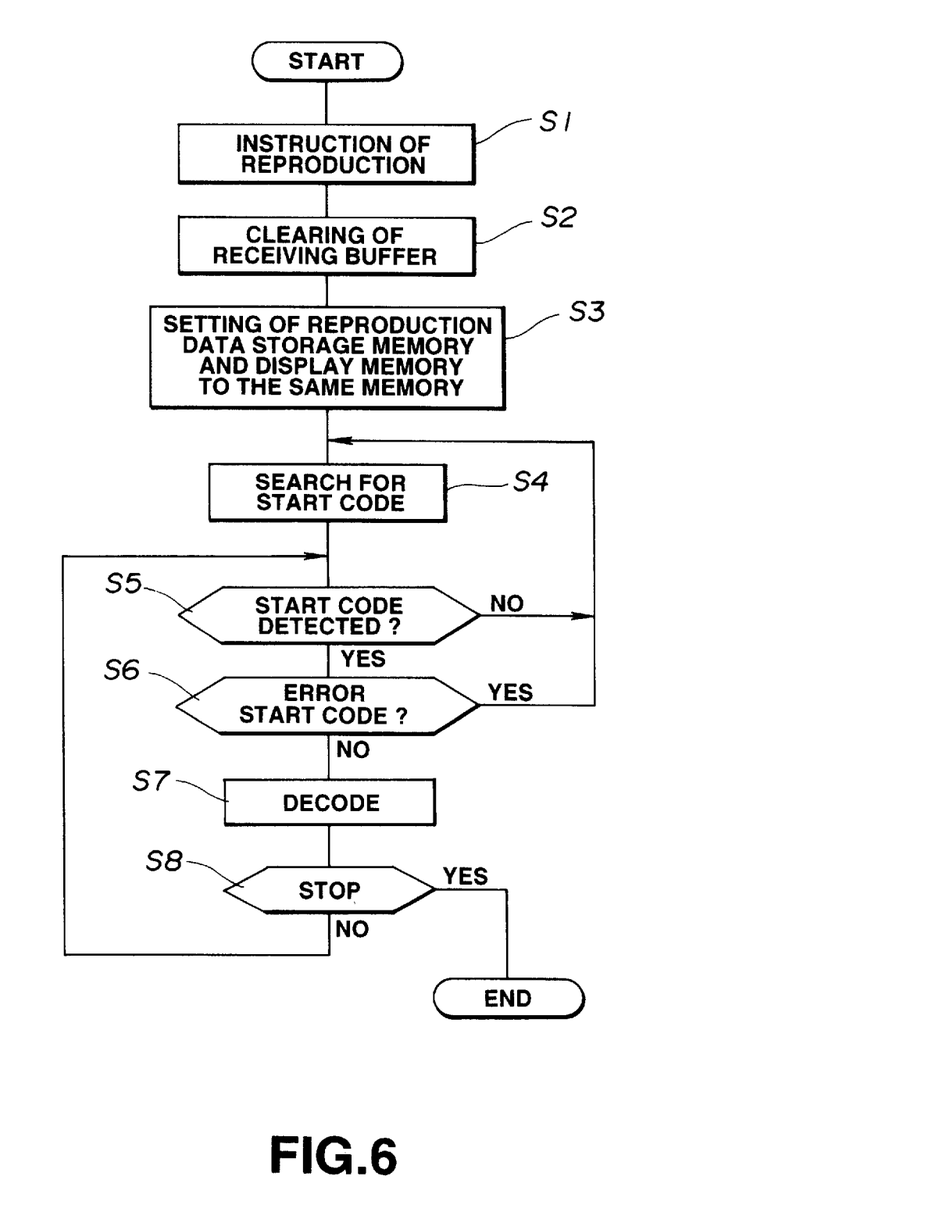
FIG. 6 is a flowchart showing the operation in the case where picture data of transfer units using slice as reference is reproduced by the above-mentioned picture reproducing apparatus.

In this case, the picture reproducing apparatus operates in accordance with the flowchart shown in FIG. 6.

First, at step S1, when fast feed or fast return reproduction is instructed from user through input operation section 19 to CPU 18 as operation information, CPU 18 sends out clear signal to receiving buffer 13. Moreover, CPU 18 sends a predetermined control signal indicating fast feed or fast return reproduction to reproduction control section 17 comprised of tracking servo circuit, etc. The reproduction control section 17 allows pick-up within reproducing section 11 to carry out repetitive operation of track jump and data read operation on the basis of the control signal.

With respect to picture data sent from reproducing section 11, error start codes are inserted at error start code inserting section 12 between picture data of transfer units as shown in FIG. 3. This error start code is in the form of a unique code which cannot be represented even by combination of any other codes similarly to the above-mentioned slice start code and is a code to which kind for error is attached. As such error start code, sequence error code of MPEG may be used. This sequence error code consists of 32 bits. Moreover, slice start code consists of 32 bits, wherein the first 24 bits are "0000 0000 0000 0000 0000 0001" similarly to the above-mentioned picture start code, and 8 bits succeeding (subsequent) thereto have a value of "B4" in hexadecimal notation. Further, error start code is expressed as "0000 0000 0000 0000 0000 0001" and 8 bits succeeding (subsequent) thereto may be a code consisting of 32 bits of a value which can discriminate between those bits and any other start codes. This error start code is inserted for the purpose of preventing invalid data included in picture data of respective transfer units from constituting start code. Timing at which error start code is inserted is instructed from reproduction control section 17.

Figure 7:
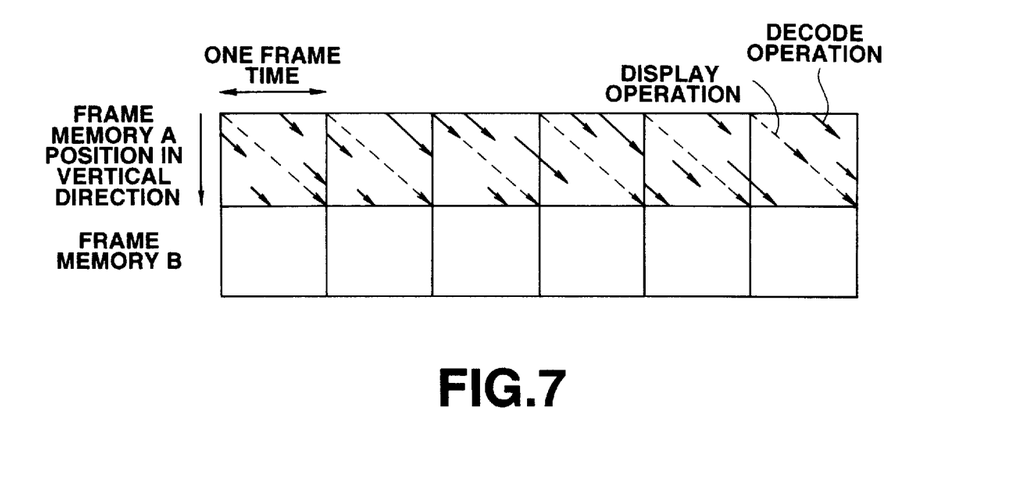
FIG. 7 is a view showing use state of frame memory in the case where picture data of transfer units using slice as reference is reproduced by the above-mentioned picture reproducing apparatus.

At step S2, when clear signal is sent from CPU 18, receiving buffer 13 clears the remaining picture data. Then, processing operation proceeds to step S3. At the step S3, CPU 18 makes such a setting with respect to frame memory 15 to use the same memory as memory for storing reproduction data of the decoded result and memory for display. Namely, memory corresponding to one memory is used for fast feed and fast return. In the example of FIG. 7, frame memory A is used. In FIG. 7, abscissa indicates time and one block indicates one frame time. Ordinate indicates position in vertical direction of picture. Moreover, arrows of solid line indicates decode operation, and indicate write operation of reproduction data with respect to frame memory. Further, arrows of dotted lines indicate display operation. Display operation displays data corresponding to one frame within time of one frame. Display picture from frame memory is displayed on display unit 16. After such a setting, processing operation proceeds to step S4.

At the step S4 and step S5, decoder 14 makes search for start code by processing start instruction from CPU 18 to continue reading of picture data until slice start code or error start code is detected. If slice start code or error start code is detected, the processing operation proceeds to step S6.

At the step S6, decoder 14 judges whether or not the detected code is error start code. In the case where that detected code is error start code, the processing operation returns to step S4. In the case where that detected code is slice start code (which becomes code for synchronization of intra-frame coded data subsequently sent) that is not error start code, the processing operation proceeds to step S7.

At the step S7, decoder 14 carries out decode operation.

Figure 2:
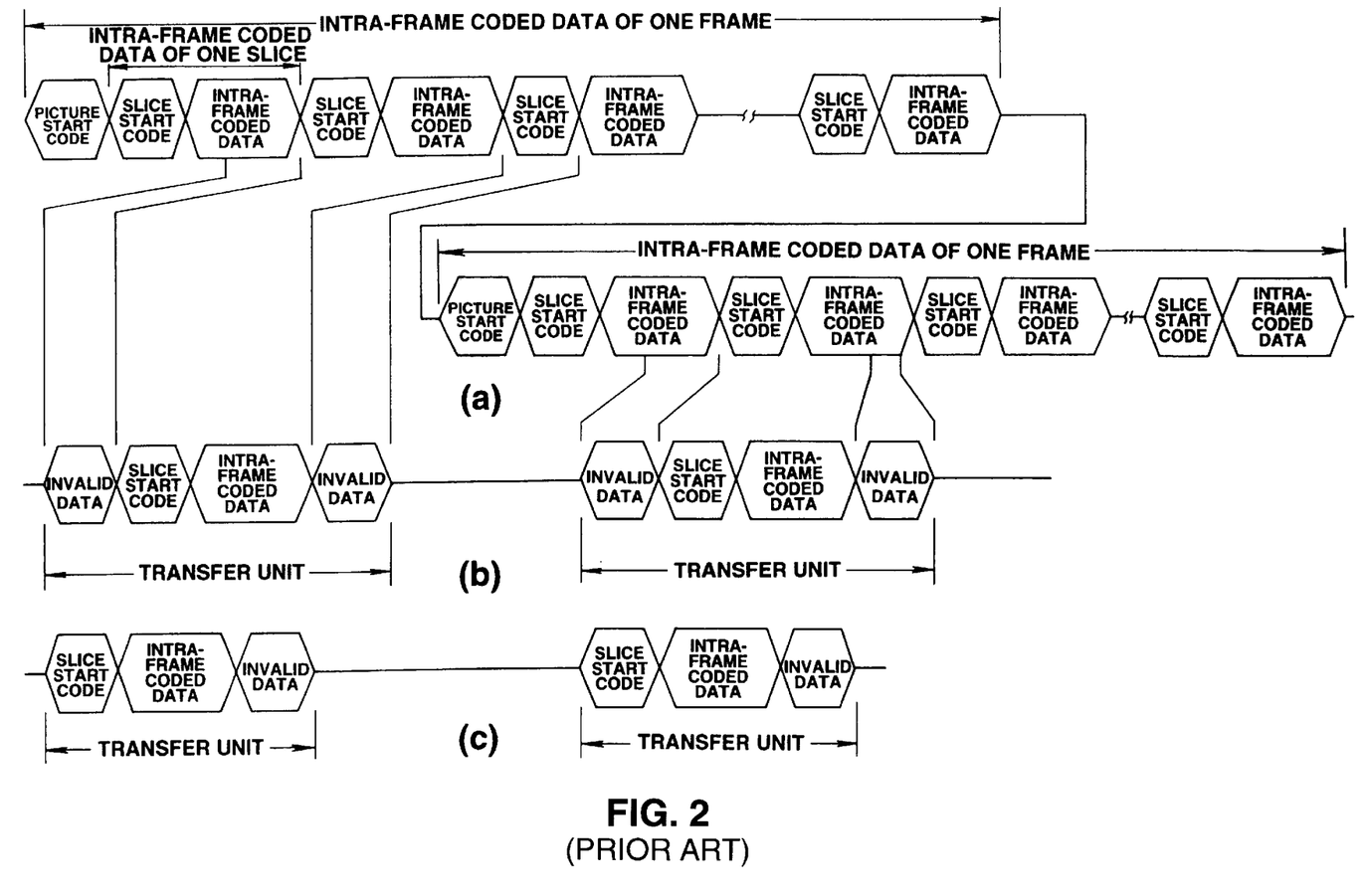
FIG. 2(A) through 2(C) are views for explaining picture data inputted to a conventional moving picture reproducing apparatus.

Namely, in decoder 14 of a structure as shown in FIG. 2, variable length decoding circuit 42 searches, at step S4, code of "0000 0000 0000 0000 0000 0001" from data obtained from receiving buffer 13. Thus, slice code or error start code is detected. Then, variable length decoding circuit 42 is operative so that when slice start code or error start code is detected at step S5, it delivers data of 8 bits succeeding (subsequent) to "0000 0000 0000 0000 0000 0001" to error start code detector 41. The error start code detector 41 judges, at step S6, from data of 8 bits delivered from variable length decoding circuit 42 whether that start code is slice start code or error start code. In the case where that start code is slice start code, error start code detector 41 instructs variable length decoding circuit 42 to start output of decode data. At step S7, decode operation of decoder 14 is started.

Decode result by decoder 14 is recorded into area within frame memory 15 corresponding to slice No. included in picture data.

At step S8, if there is processing stop (end) instruction from CPU 18, decoder 14 completes decode operation. In the case where the decode operation is not completed, the processing operation returns to step S5. By the operation up to now, error start codes and invalid data attached at the first portions of transfer units of inputted picture data are removed. In the case where error start code is found during decode operation, the last invalid data of transfer unit is not used as data unnecessary for decode operation. By the above-described operation, it is possible to decode picture data including invalid data sent from reproducing section 11. Thus, fast feed and fast return operations can be made as the picture signal reproducing apparatus.

In this example, since transfer unit of picture data is less than one frame, arrows of solid line indicating decode operation are written by short lines less than one frame in FIG. 7. Difference in length indicates that data quantities of intra-frame coded data included in transfer units are different from each other. In accordance with this system, quantity of intra-frame coded data included in transfer unit may take arbitrary value, and is not therefore limited.

The case where picture data of transfer unit sent from reproducing section 11 includes intra-frame coded data more than one frame will now be described.

Figure 8:
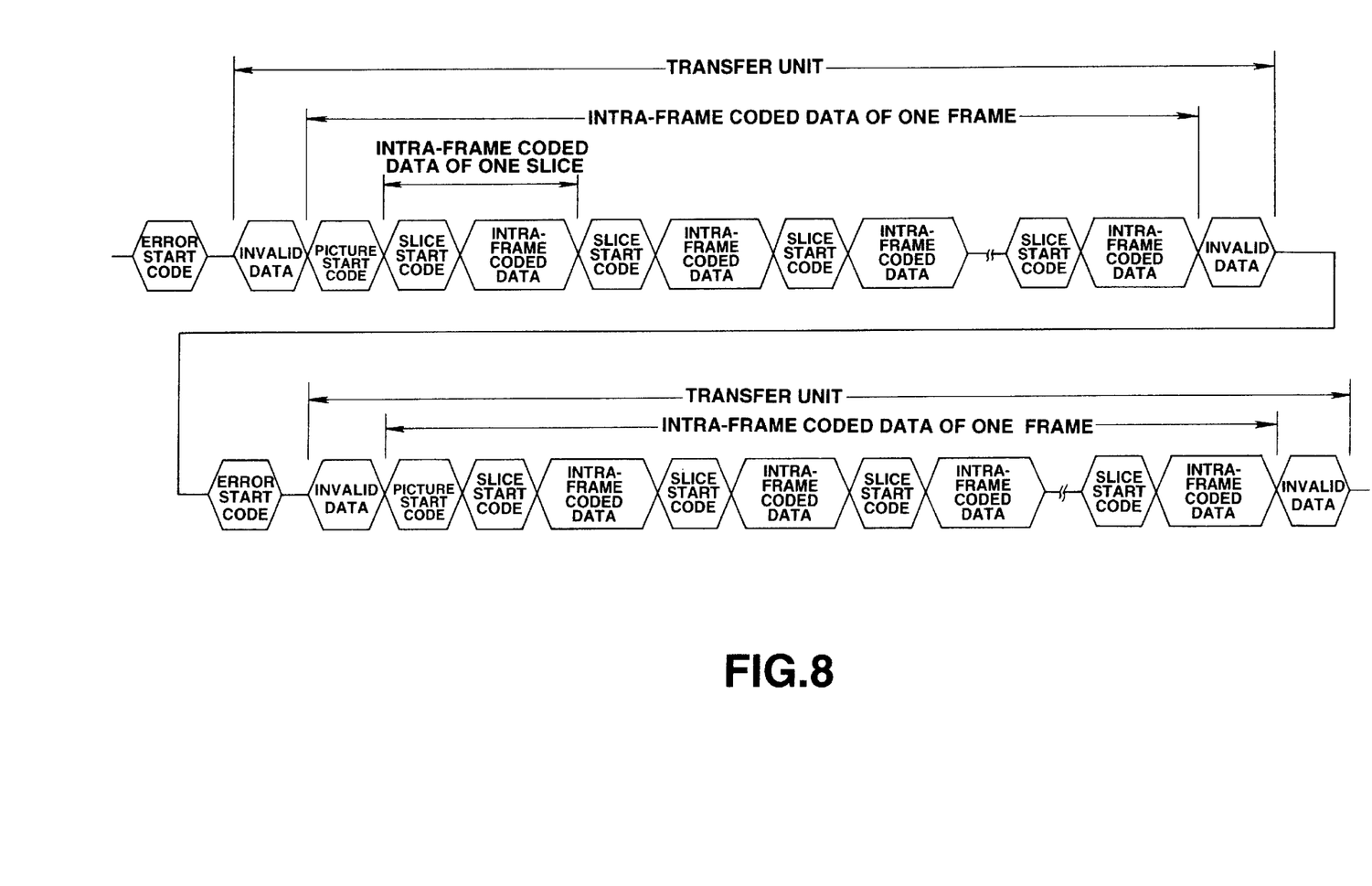
FIG. 8 is a view for explaining picture data of transfer units using frame as reference handled in the above-mentioned picture reproducing apparatus.

Picture data of transfer units sent from reproducing section 11 includes intra-frame coded data more than one frame as shown in FIG. B. Error start codes are inserted between picture data of transfer units by error start code inserting section 12. This error start code is in the form of a unique code which cannot be represented even by combination of any other codes similarly to the above-mentioned picture start code, and is a code to which kind for error is attached. This error start code is inserted for the purpose of preventing invalid data included in picture data of respective transfer units from constituting picture start code. Timing at which error start code is inserted is instructed from reproduction control section 17.

Figure 9:
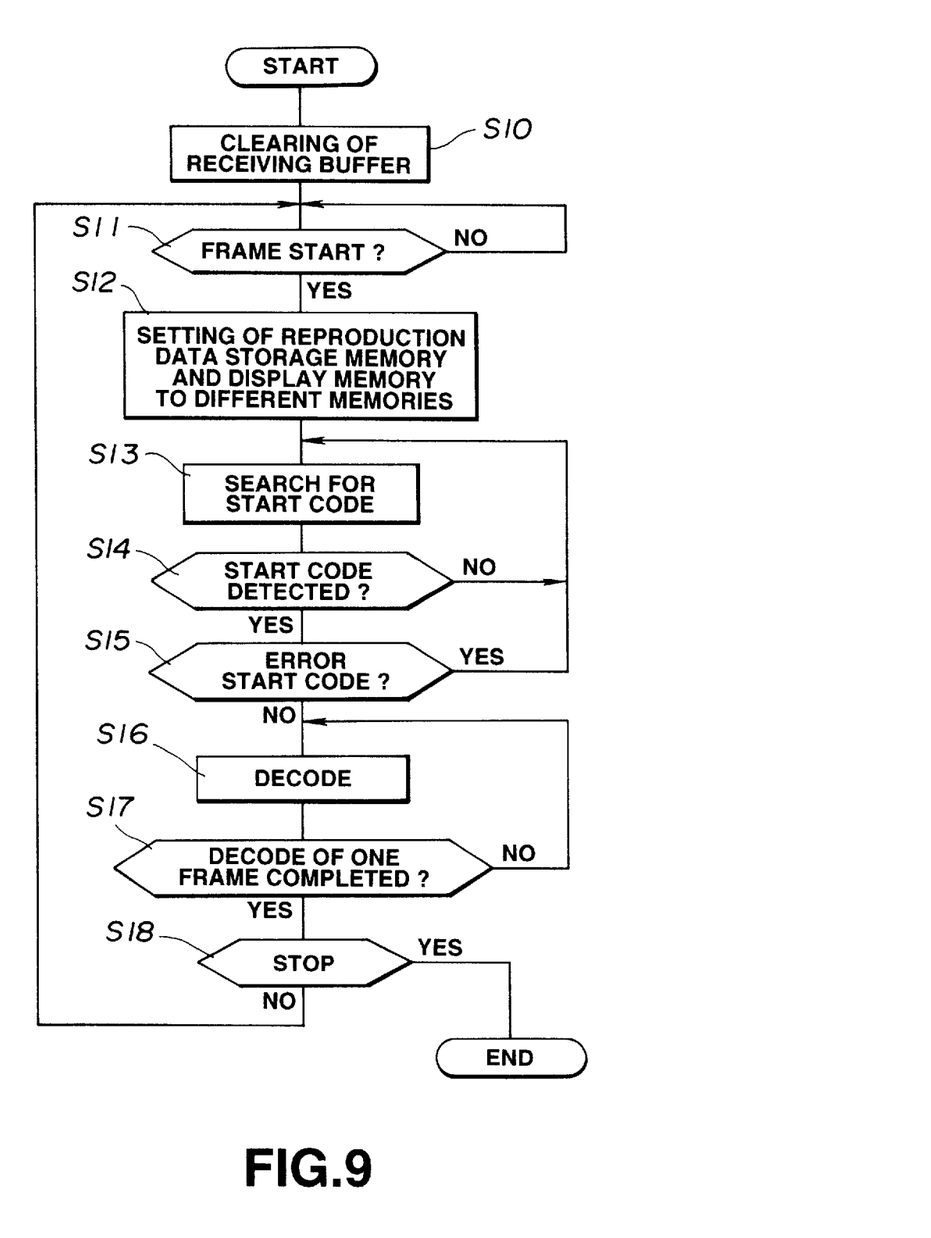
FIG. 9 is a flowchart showing the operation in the case where picture data of transfer units using frame as reference is reproduced by the above-mentioned picture reproducing apparatus.

The picture signal reproducing apparatus which has received such picture data operates in accordance with the flowchart shown in FIG. 9.

At step S10, when clear signal is sent from CPU 18, receiving buffer 13 clears the remaining picture data. Then, the processing operation proceeds to step S11. At the step S11, decoder 14 waits frame start delivered from CPU 18. This ensures that decoder 14 is caused to be operative in synchronism with display of display unit 16. CPU 18 outputs frame start in synchronism with synchronizing signal from display unit 16. Respective blocks of decoder 14 operate in synchronism with frame start. Then, the processing operation proceeds to step S12.

Figure 10:
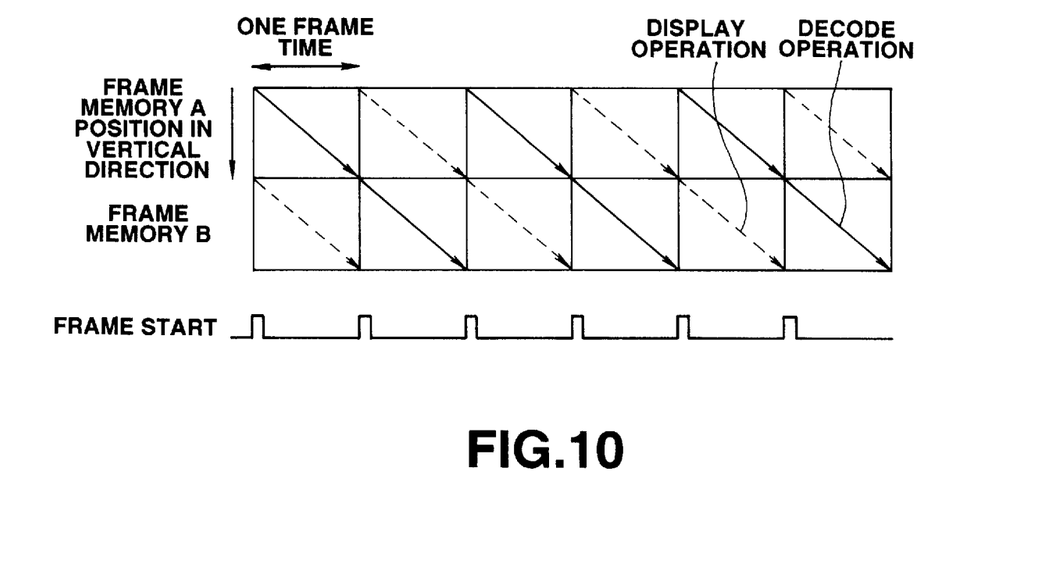
FIG. 10 is a view showing use state of frame memory in the case where picture data of transfer units using frame as reference is reproduced by the above-mentioned picture reproducing apparatus.

At the step S12, CPU 18 makes such a setting with respect to frame memory 15 to respectively use different memories as memory for storing reproduction data of decoded result and memory for display. Namely, memories corresponding to 2 frames are used for fast feed and fast return. In the example of FIG. 10, frame memory A and frame memory B are alternately used. In FIG. 10, abscissa indicates time and one block is one frame time. Ordinate indicates position in vertical direction of picture. Moreover, arrows of solid line indicates decode operation, and indicate write operation of reproduction data with respect to frame memory. Further, arrows of dotted lines indicate display operation. Display operation displays data corresponding to one frame within time of one frame. Display picture from frame memory is displayed on display unit 16. After such a setting, the processing operation proceeds to step S13.

At the step S13 and step S14, decoder 14 makes search for start code by processing start instruction from CPU 18 to continue reading of picture data until picture start code or error start code is detected. If picture start code or error start code is detected, the processing operation proceeds to step S15.

At the step S15, in the case where the detected code was error start code, the processing operation returns to step S13. In the case where the detected code is picture start code (which becomes code for synchronization of intra-frame coded data subsequently sent) that is not error start code, the processing operation proceeds to step S16. At the step S16, decoder 14 carries out decode operation.

Namely, in decoder 14 of a structure as shown in the FIG. 4 mentioned above, variable length decoding circuit 42 searches, at step S13, code of "0000 0000 0000 0000 0000 0001" from data obtained from receiving buffer 13. Thus, picture start code or error start code is detected. Then, variable length decoding circuit 42 is operative so that when slice code or error start code is detected at step S14, it delivers data of 8 bits succeeding (subsequent) to "0000 0000 0000 0000 0000 0001" to error start code detector 41. The error start code detector 41 judges, at step S15, from data of 8 bits delivered from variable length decoding circuit 42 whether that start code is picture start code or error start code. In the case where that start code is picture start code, error start code detector 41 instructs variable length decoding circuit 42 to start output of decode data. At step S16, decode operation of decoder 14 is started.

Then, decode result by decoder 14 is recorded into area within frame memory 15 corresponding to slice No. included in picture data. By the operation up to now, error start codes and invalid data attached at the first portions of transfer units of inputted picture data are eliminated.

At step S17, decoder 14 repeatedly returns to step S16 until decode of intra-frame coded data of one frame is completed. When such decode operation is completed, the processing operation proceeds to step S18. It should be noted that decoder 14 is instructed in advance from CPU 18 with respect to frame size.

At the step S18, if there is stop (end) instruction from CPU 18, decoder 14 completes decode operation. In the case where such decode operation is not completed, the processing operation returns to step S11 to repeat the above-described operation. Then, the last invalid data of transfer units are removed in the process for seeking for picture start code. By the above-described operation, it is possible to decode picture data including invalid data sent from reproducing section 11. Thus, fast feed and fast return operations can be made as the picture signal reproducing apparatus. In this example, since transfer unit of picture data is more than one frame and decode operation is carried out with one frame being as a unit, arrows of solid line indicating decode operation are written by line corresponding to one frame in FIG. 10. While there is difference of one frame between decode operation and display operation in the example of FIG. 10, such difference may be more than one frame, or less than one frame. In this system, such a difference is not limited.

What is claimed is:

1. A picture signal decoding method of decoding coded picture signals recorded on a recording medium to carry out fast feed or fast return reproduction, the method comprising the steps of:

reproducing a portion of the coded picture signals recorded on the recording medium every predetermined transfer units, each reproduced transfer unit including a first unique code or codes and intra-frame coded data to generate a reproduced coded picture signal;

inserting a second unique code, that is not a portion of the coded picture signals recorded on the recording medium, between the reproduced transfer units in the reproduced coded picture signal;

detecting the first unique code in the reproduced coded picture signal;

decoding the reproduced coded picture signal in synchronism with the detected first unique code to generate a decoded picture; and discarding a portion of the reproduced picture signal between detecting the first unique code and detecting the second unique code, wherein the second unique code includes a common code that is included in the first and second unique code and the second unique code further includes a non-common code that is not included in the first and second unique codes.

2. A picture signal decoding method as set forth in claim 1, wherein the step of detecting the first unique code includes steps of:

detecting the common code included in the first and second unique codes; and discriminating between the unique codes on the basis of the non-common code included in the first and second unique codes.

3. A picture signal decoding method as set forth in claim 1, wherein the first unique code is slice start code, and wherein the predetermined transfer unit includes at least one slice start code and intra-frame coded data of at least one slice.

4. A picture signal decoding method as set forth in claim 1, wherein the first unique code is picture start code, and wherein the predetermined transfer unit includes at least one picture start code and intra-frame coded data of at least one frame.

5. A picture signal decoding method of decoding coded picture signals recorded on a recording medium to carry out fast feed or fast return reproduction, the method comprising the steps of:

reproducing a portion of the coded picture signals recorded on the recording medium every predetermined transfer units including intra-frame coded data of at least one slice;

sequentially decoding the reproduced coded picture signal in slice units to generate decoded intra-frame pictures of slice units;

sequentially storing the decoded intra-frame pictures of slice units into a memory corresponding to only one frame; and reading out data stored in the memory corresponding to one frame of decoded intra-frame pictures of slice units as a display picture, wherein each reproduced transfer unit includes a first unique code or codes, and further including the steps of:

inserting a second unique code, that is not a portion of the coded picture signals recorded on the recording medium, between the reproduced transfer units in the reproduced coded picture signal; and discarding a portion of the reproduced picture signal between detecting the first unique code and detecting the second unique code as the data stored in the memory is read out, wherein the second unique code includes a common code that is included in the first and second unique code and the second unique code further includes a non-common code that is not included in the first and second unique codes.

6. A picture signal decoding method of decoding coded picture signals recorded on a recording medium to carry out fast feed or fast return reproduction, the method comprising the steps of:

reproducing a portion of the coded picture signals recorded on the recording medium every predetermined transfer units including intra-frame coded picture data of at least one frame;

sequentially decoding the reproduced coded picture signals in frame units to generate decoded intra-frame code pictures of frame units;

alternately storing the decoded intra-frame pictures of frame units into first and second frame memories; and alternately reading out data of the decoded intra-frame pictures of frame units thus stored in the first and second frame memories as a display picture, wherein each reproduced transfer unit includes a first unique code or codes, and further including the steps of:

inserting a second unique code, that is not a portion of the coded picture signals recorded on the recording medium, between the reproduced transfer units in the reproduced coded picture signal; and discarding a portion of the reproduced picture signal between detecting the first unique code and detecting the second unique code as the data stored in the memory is read out, wherein the second unique code includes a common code that is included in the first and second unique code and the second unique code further includes a non-common code that is not included in the first and second unique codes.

7. A picture signal decoding apparatus adapted for decoding coded picture signals recorded on a recording medium to carry out fast feed or fast return reproduction, the apparatus comprising:

reproducing means for reproducing a portion of the coded picture signals recorded on the recording medium every predetermined transfer units each reproduced transfer unit including a first unique code or codes and intra-frame coded data to generate a reproduced coded picture signal;

code inserting means for inserting a second unique code, that is not a portion of the coded picture signals recorded on the recording medium, between the reproduced transfer units in the reproduced coded picture signal;

code detecting means for detecting the first unique code in the reproduced coded picture signal; and decoding means for decoding the reproduced coded picture signal in synchronism with the detected first unique code to generate a decoded picture, wherein each reproduced transfer unit includes a first unique code or codes, and further including the steps of:

inserting a second unique code, that is not a portion of the coded picture signals recorded on the recording medium, between the reproduced transfer units in the reproduced coded picture signal; and discarding a portion of the reproduced picture signal between detecting the first unique code and detecting the second unique code as the data stored in the memory is read out, wherein the second unique code includes a common code that is included in the first and second unique code and the second unique code further includes a non-common code that is not included in the first and second unique codes.

8. A picture signal decoding apparatus as set forth in claim 7, wherein the code detecting means for detecting the first unique code includes;

means for detecting the common code included in the first and second unique codes; and means for discriminating between the unique codes on the basis of the non-common code included in the first and second unique codes.

9. A picture signal decoding apparatus as set forth in claim 7, wherein the first unique code is slice start code, and wherein the predetermined transfer unit includes at least one slice start code and intra-frame coded data of at least one slice.

10. A picture signal decoding apparatus as set forth in claim 7, wherein the first unique code is picture start code, and wherein the predetermined transfer unit includes at least one picture start code and intra-frame coded data of at least one frame.

11. A picture signal decoding apparatus adapted for decoding coded picture signals recorded on a recording medium to carry out fast feed or fast return reproduction, the apparatus comprising:

reproducing means for reproducing a portion of the coded picture signals recorded on the recording medium every predetermined transfer units including intra-frame coded data of at least one slice;

decoding means for sequentially decoding the reproduced coded picture signal in slice units to generate decoded intra-frame pictures of slice units; and memory means corresponding to only one frame for sequentially storing decoded intra-frame pictures of slice units, and outputting picture data stored therein as a display picture, wherein each reproduced transfer unit includes a first unique code or codes, and further including the steps of:

inserting a second unique code, that is not a portion of the coded picture signals recorded on the recording medium, between the reproduced transfer units in the reproduced coded picture signal; and discarding a portion of the reproduced picture signal between detecting the first unique code and detecting the second unique code as the data stored in the memory is read out, wherein the second unique code includes a common code that is included in the first and second unique code and the second unique code further includes a non-common code that is not included in the first and second unique codes.

12. A picture signal decoding apparatus adapted for decoding coded picture signals recorded on a recording medium to carry out fast feed or fast return reproduction, the apparatus comprising:

reproducing means for reproducing a portion of the coded picture signals recorded on the recording medium every predetermined transfer units including intra-frame coded picture data of at least one frame;

decoding means for sequentially decoding the reproduced coded picture signals in frame units to generate intra-frame decoded pictures of frame units; and first and second frame memories for alternately storing the decoded intra-frame pictures of frame units, and alternately outputting the thus-stored intra-frame pictures as a display picture, wherein each reproduced transfer unit includes a first unique code or codes, and further including the steps of:

inserting a second unique code, that is not a portion of the coded picture signals recorded on the recording medium, between the reproduced transfer units in the reproduced coded picture signal; and discarding a portion of the reproduced picture signal between detecting the first unique code and detecting the second unique code as the data stored in the memory is read out, wherein the second unique code includes a common code that is included in the first and second unique code and the second unique code further includes a non-common code that is not included in the first and second unique codes.

* * * * *